(12) United States Patent
Li et al.

(10) Patent No.: US 10,477,536 B2
(45) Date of Patent: Nov. 12, 2019

(54) METHOD AND APPARATUS FOR SCHEDULING TRANSMISSION RESOURCE IN VEHICULAR NETWORK

(71) Applicant: HUAWEI TECHNOLOGIES CO., LTD., Shenzhen, Guangdong (CN)

(72) Inventors: Mingchao Li, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/637,315

(22) Filed: Jun. 29, 2017

(65) Prior Publication Data

US 2017/0303272 A1    Oct. 19, 2017

Related U.S. Application Data

(63) Continuation of application No. PCT/CN2014/095977, filed on Dec. 31, 2014.

(51) Int. Cl.
  *H04W 72/04* (2009.01)
  *H04W 72/08* (2009.01)
  *H04W 4/04* (2009.01)

(52) U.S. Cl.
  CPC ....... *H04W 72/0433* (2013.01); *H04W 4/046* (2013.01); *H04W 72/04* (2013.01); *H04W 72/087* (2013.01)

(58) Field of Classification Search
  CPC . H04W 4/046; H04W 72/04; H04W 72/0433; H04W 72/087; H04W 72/0446;
  (Continued)

(56) References Cited

U.S. PATENT DOCUMENTS

2013/0157669 A1   6/2013  Turtinen et al.
2014/0038610 A1   2/2014  Jeong et al.
(Continued)

FOREIGN PATENT DOCUMENTS

CN    103812605 A    5/2014
CN    103812786 A    5/2014
(Continued)

OTHER PUBLICATIONS

International Search Report dated Sep. 29, 2015 in corresponding International Patent Application No. PCT/CN2014/095977.
(Continued)

*Primary Examiner* — Kyaw Z Soe
(74) *Attorney, Agent, or Firm* — Leydig, Voit & Mayer, Ltd.

(57) ABSTRACT

The present invention provides a method and an apparatus tear scheduling a transmission resource in a vehicular network, so as to resolve problems in the prior art that signaling overheads of a base station are increased and load of the base station is increased because a manner of scheduling by the base station is used to obtain a transmission resource. The method is: receiving, by a terminal, micro network system information that is sent by a node and that carries a micro network identifier and a node identifier, so as to access a micro network; when a communication task is generated, determining a target resource scheduling manner according to the communication task; obtaining a target transmission resource in the accessed micro network according to the determined target resource scheduling manner; and eventually sending, based on the target transmission resource, data that corresponds to the communication task.

20 Claims, 8 Drawing Sheets

(58) Field of Classification Search
CPC ......... H04W 72/0453; H04W 72/1278; H04W 74/08; H04W 74/0833; H04W 84/045
See application file for complete search history.

(56) References Cited

U.S. PATENT DOCUMENTS

| | | | |
|---|---|---|---|
| 2015/0043490 A1* | 2/2015 | Wu | H04W 8/26 370/329 |
| 2015/0119054 A1 | 4/2015 | Morioka | |
| 2015/0282166 A1 | 10/2015 | Zhao et al. | |
| 2016/0219475 A1* | 7/2016 | Kim | H04L 5/00 |

FOREIGN PATENT DOCUMENTS

| | | |
|---|---|---|
| CN | 103957579 A | 7/2014 |
| CN | 104010340 A | 8/2014 |
| CN | 104050555 A | 9/2014 |
| CN | 104080176 A | 10/2014 |
| EP | 2789118 B1 | 9/2015 |
| JP | 2000-004468 A | 1/2000 |
| JP | 2013-255061 A | 12/2013 |
| JP | 2014-090506 A | 5/2014 |

OTHER PUBLICATIONS

Japanese Office Action dated Jul. 30, 2018 in corresponding to Japanese Patent Application No. 2017-535385, 4 pgs.
Cheng Hanhan et al., "Research on RSU-based Broadcasting Protocol in VANET", Journal of Tianjin University of Science and Technology, vol. 29 No. 3, Jun. 2014, 5 pages.
Yan Ling, "The RSU Access Problem Based on Game Theory for VANET", Dalian University of Technology, Masteral Dissertation, Jun. 5, 2013, 50 pages.
Jeonghee Chi et al., "Intersection-Priority based Optimal RSU Allocation for VANET", 2013 Fifth International Conference on Ubiquitous and Future Networks (ICUFN), pp. 350-355.
Mianxiong Dong et al., "A Novel Information Dissemination System for Vehicle-to-RSU Communication Networks", 2013 International Conference on Connected Vehicles and Expo (ICCVE), pp. 918-919.
Chinese Office Action dated Jan. 28, 2019 from Chinese Patent Application No. 201480032634.3, 6 pages.

* cited by examiner

METHOD AND APPARATUS FOR SCHEDULING TRANSMISSION RESOURCE IN VEHICULAR NETWORK

CROSS-REFERENCE TO RELATED APPLICATION

This application is a continuation of International Application No. PCT/CN2014/095977, filed on Dec. 31, 2014, the disclosure of which is hereby incorporated by reference in its entirety.

TECHNICAL FIELD

The present invention relates to the field of communications technologies, and in particular, to a method and an apparatus for scheduling a transmission resource in a vehicular network.

BACKGROUND

With gradual development of the society, cars are becoming increasingly popular. Traveling by cars provides people with a convenient manner of transportation, but also causes negative impact on the human society, for example, traffic jams in urban areas and frequent traffic accidents. Obviously, an intelligent transportation system (ITS) needs to be established for the development of the society.

Currently, Vehicles may obtain road condition information or receive other service information by means of vehicle to vehicle (V2V) communication or vehicle to infrastructure (V2I) communication, and a network used in V2V and V2I communication is referred to as a vehicular network. Specifically, a vehicle may broadcast, to a nearby vehicle by means of V2V communication, driving information such as a speed of the vehicle, a driving direction, a specific location, or whether emergent braking is performed. Therefore, a driver of a vehicle that obtains driving information of a nearby vehicle may better perceive a traffic condition beyond the line of sight, so as to predict in advance and avoid a dangerous condition. For the V2I communication, in addition to the foregoing exchange of driving information, the infrastructure of transportation may further provide various types of service information and support of a data network to vehicles, thereby improving the intelligence of transportation.

A Long Term Evolution (LTE) technology is currently a mainstream wireless communications technology, and has desirable network coverage. Therefore, V2V communication and V2I communication are combined with the LTE technology to improve communication performance of a vehicular network. Because a manner of allocating transmission resources in the LTE technology is a centralized control manner, a base station schedules and configures transmission resources in a centralized manner for terminals, that is, vehicles or the infrastructure of transportation, so that a resource collision problem is avoided, thereby ensuring QoS of a service. The resource collision problem occurs as multiple terminals contend for one same transmission resource when a free contention manner is used to obtain a transmission resource. However, in a vehicular network, in both the communication V2V and V2I communication, a vehicle needs to frequently send information such as driving information to a nearby vehicle or the infrastructure of transportation and frequently receive information such as driving information sent by another vehicle or the infrastructure of transportation. Each time when data is sent, a sending request needs to be reported to the base station, and the base station allocates a transmission resource and notifies, by using signaling, a terminal of the allocated transmission resource. Therefore, frequent data transmission of a vehicle results in frequent signaling interactions with the base station. Consequently, signaling overheads of the base station are increased. In addition, the base station also needs to allocate transmission resources multiple times. As a result, load of the base station is increased, and work efficiency of the base station is reduced.

SUMMARY

Embodiments of the present invention provide a method for scheduling a transmission resource in a vehicular network, so as to resolve problems in the prior art that signaling overheads of a base station are increased, load of the base station is increased, and work efficiency of the base station is reduced because a manner of scheduling by the base station is used to obtain a transmission resource.

According to a first aspect, an apparatus for scheduling a transmission resource in a vehicular network is provided, including:

a receiving unit, configured to: receive macro network system information sent by a base station, where the macro network system information carries node transmission resource information; and receive, according to a target node transmission resource determined by a first determining unit, micro network system information sent by a node, where the micro network system information carries a micro network identifier and a node identifier;

the first determining unit, configured to determine the target node transmission resource according to the node transmission resource information carried in the macro network system information received by the receiving unit;

a processing unit, configured to access a micro network according to the micro network identifier and the node identifier that are carried in the micro network system information received by the receiving unit;

a second determining unit, configured to: when a communication task is generated, determine, according to a task type of the communication task, a target resource scheduling manner in the micro network that the processing unit accesses;

an obtaining unit, configured to obtain a target transmission resource in the accessed micro network according to the target resource scheduling manner determined by the second determining unit; and a running unit, configured to send, based on the target transmission resource obtained by the obtaining unit, data that corresponds to the communication task.

With reference to the first aspect, in a first possible implementation manner, the obtaining unit is specifically configured to:

when the determined target resource scheduling manner is a contention manner, determine the target transmission resource in the accessed micro network according to the micro network system information; or when the determined target resource scheduling manner is a centralized scheduling manner, send resource request information to the node.

With reference to the first possible implementation manner of the first aspect, in a second possible implementation manner, after the obtaining unit sends the resource request information to the node, the receiving unit is further configured to:

receive the target transmission resource that is returned by the node based on the resource request information.

With reference to the first aspect or any one of the foregoing possible implementation manners of the first aspect, in a third possible implementation manner, the receiving unit is specifically configured to:

receive, by using a system information broadcast SIB or radio resource control RRC signaling, the macro network system information sent by the base station.

With reference to the second possible implementation manner of the first aspect, in a fourth possible implementation manner, when receiving the macro network system information sent by the base station, the receiving unit is specifically configured to:

receive the macro network system information that is sent by the base station and that further includes a micro network working frequency, a scheduled scheduling assignment SA resource pool, and a contention SA resource pool, where each scheduled SA resource in the scheduled SA resource pool and each contention SA resource in the contention SA resource pool are time-frequency resources in a frequency band in which the micro network working frequency is located, and the time-frequency resource is used to indicate a time-frequency location of a transmission resource and a corresponding modulation and coding scheme; or receive the macro network system information that is sent by the base station and that further includes a micro network working frequency, a scheduled transmission resource pool, and a contention transmission resource pool, where each scheduled transmission resource in the scheduled transmission resource pool and each contention transmission resource in the contention transmission resource pool are transmission resources in a frequency band in which the micro network working frequency is located.

With reference to the fourth possible implementation manner of the first aspect, in a fifth possible implementation manner, when receiving the node transmission resource information carried in the macro network system information sent by the base station, the receiving unit is specifically configured to:

when receiving the macro network system information that is sent by the base station and that further includes the micro network working frequency, the scheduled SA resource pool, and the contention SA resource pool, further receive a node SA resource pool carried in the macro network system information sent by the base station, where each node SA resource in the node SA resource pool is a time-frequency resource in the frequency band in which the micro network working frequency is located, and the time-frequency resource is used to indicate a time-frequency location of a transmission resource and a corresponding modulation and coding scheme.

With reference to the fourth possible implementation manner of the first aspect, in a sixth possible implementation manner, when receiving the node transmission resource information carried in the macro network system information sent by the base station, the receiving unit is specifically configured to:

when receiving the macro network system information that is sent by the base station and that further includes the micro network working frequency, the scheduled transmission resource pool, and the contention transmission resource pool, further receive a node transmission resource pool carried in the macro network system information sent by the base station, where each node transmission resource in the node transmission resource pool is a transmission resource in the frequency band in which the micro network working frequency is located.

With reference to the fifth possible implementation manner of the first aspect, in a seventh possible implementation manner, the first determining unit is further configured to:

determine whether the node transmission resource information carried in the macro network system information received by the receiving unit is the node SA resource pool; and when the first determining unit determines that the node transmission resource information carried in the macro network system information is the node SA resource pool, the first determining unit is specifically configured to:

search, in the node SA resources in the node SA resource pool, for at least one node SA resource that is in the specified frequency band in which the micro network working frequency is located and that includes node SA information, where when any node SA resource includes node SA information, the node is instructed to transmit the micro network system information by using a transmission resource that corresponds to the any node SA resource;

select, from the found at least one node SA resource, one node SA resource as a target node SA resource; and determine a transmission resource that corresponds to a time-frequency location of the transmission resource indicated by the target node SA resource, and use the determined transmission resource as the target node transmission resource.

With reference to the sixth possible implementation manner of the first aspect, in an eighth possible implementation manner, the first determining unit is further configured to:

determine whether the node transmission resource information carried in the macro network system information received by the receiving unit is the node transmission resource pool; and when the first determining unit determines that the node transmission resource information carried in the macro network system information is the node transmission resource pool, the first determining unit is specifically configured to:

search the node transmission resources in the node transmission resource pool for at least one node transmission resource that is in the specified frequency band in which the micro network working frequency is located and on which the micro network system information sent by the node can be received; and select, from the found at least one node transmission resource, one node transmission resource as the target node transmission resource.

With reference to the fifth or the seventh possible implementation manner of the first aspect, in a ninth possible implementation manner, when receiving the micro network system information sent by the node, the receiving unit is specifically configured to:

receive the micro network system information that is sent by the node and that further includes a micro network scheduled SA sending resource pool and a micro network contention SA sending resource pool, where each micro network scheduled SA sending resource in the micro network scheduled SA sending resource pool and each micro network contention SA sending resource in the micro network contention SA sending resource pool are time-frequency resources in the frequency band in which the micro network working frequency is located, and the time-frequency resource is used to indicate a time-frequency location of a transmission resource and a corresponding modulation and coding scheme.

With reference to the sixth or the eighth possible implementation manner of the first aspect, in a tenth possible implementation manner, when receiving the micro network system information sent by the node, the receiving unit is specifically configured to:

receive the micro network system information that is sent by the node and that further includes a micro network scheduled sending resource pool and a micro network contention sending resource pool, where each micro network scheduled sending resource in the micro network scheduled sending resource pool and each micro network contention sending resource in the micro network contention sending resource pool are transmission resources in the frequency band in which the micro network working frequency is located.

With reference to the ninth or the tenth possible implementation manner of the first aspect, in an eleventh possible implementation manner, when receiving the micro network system information sent by the node, the receiving unit is specifically configured to:

receive the micro network system information that is sent by the node and that further includes a mapping relationship between a task type and a resource scheduling manner, where each task type corresponds to at least one resource scheduling manner in the mapping relationship.

With reference to any one of the fourth to the eleventh possible implementation manners of the first aspect, in a twelfth possible implementation manner, the processing unit is specifically configured to:

complete its own configuration according to the micro network identifier and the node identifier, and establish a connection to the node that corresponds to the node identifier.

With reference to the eleventh possible implementation manner of the first aspect, in a thirteenth possible implementation manner, when determining the target resource scheduling manner in the accessed micro network according to the task type of the communication task, the second determining unit is specifically configured to:

search, according to the task type of the communication task, the mapping relationship between a task type and a resource scheduling manner for at least one resource scheduling manner that corresponds to the task type; and select, from the found resource scheduling manner according to a preset priority of a resource scheduling manner, one resource scheduling manner as the target resource scheduling manner.

With reference to the ninth possible implementation manner of the first aspect, in a fourteenth possible implementation manner, when determining the target transmission resource in the accessed micro network according to the micro network system information, the obtaining unit is specifically configured to:

determine whether the micro network contention SA sending resource pool in the micro network system information includes an idle micro network contention SA sending resource; and if the micro network contention SA sending resource pool includes an idle micro network contention SA sending resource, select one micro network contention SA sending resource from the idle micro network contention SA sending resource, and determine, according to a time-frequency location of a transmission resource indicated by the selected micro network contention SA sending resource, the transmission resource that corresponds to the time-frequency location, as the target transmission resource; otherwise, select one idle contention SA resource from the contention SA resource pool in the macro network system information, and determine, according to a time-frequency location of a transmission resource indicated by the selected contention SA resource, the transmission resource that corresponds to the time-frequency location, as the target transmission resource.

With reference to the tenth possible implementation manner of the first aspect, in a fifteenth possible implementation manner, when determining the target transmission resource in the accessed micro network according to the micro network system information, the obtaining unit is specifically configured to:

determine whether the micro network contention sending resource pool in the micro network system information includes an idle micro network contention sending resource; and if the micro network contention sending, resource pool includes an idle micro network contention sending resource, select one or more micro network contention sending resources from the idle micro network contention sending resource, and use the selected micro network contention sending resource as the target transmission resource; otherwise, select one or more idle contention transmission resources from the contention transmission resource pool in the macro network system information, and use the selected contention transmission resource as the target transmission resource.

With reference to any one of the fourth to the fourteenth possible implementation manners of the first aspect, in a sixteenth possible implementation manner, when sending the resource request information to the node, the obtaining unit is specifically configured to:

send the resource request information that includes task information of the communication task to the node, where the task information includes any one or a combination of the following: a task type, a task priority, or service traffic.

With reference to any one of the fourth to the fifteenth possible implementation manners of the first aspect, in a seventeenth possible implementation manner, when receiving the target transmission resource that is returned by the node based on the resource request information, the receiving unit is specifically configured to:

receive resource licensing information that is returned by the node based on the resource request information and that includes the target transmission resource.

With reference to the seventeenth possible implementation manner of the first aspect, in an eighteenth possible implementation manner, when receiving the target transmission resource included in the resource licensing information, the receiving unit is specifically configured to:

receive the target transmission resource included in the resource licensing information, where a micro network scheduled SA sending resource that corresponds to a time-frequency location of the target transmission resource belongs to the micro network scheduled SA sending resource pool; or receive the target transmission resource included in the resource licensing information, where a scheduled SA resource that corresponds to a time-frequency location of the target transmission resource belongs to the scheduled SA resource pool.

With reference to the seventeenth possible implementation manner of the first aspect, in a nineteenth possible implementation manner, when receiving the target transmission resource included in the resource licensing information, the receiving unit is specifically configured to:

receive the target transmission resource that is included in the resource licensing information and that belongs to the micro network scheduled sending resource pool or the scheduled transmission resource pool.

According to a second aspect, a method for scheduling a transmission resource in a vehicular network is provided, including:

receiving macro network system information sent by a base station, where the macro network system information carries node transmission resource information;

determining a target node transmission resource according to the node transmission resource information;

receiving, according to the target node transmission resource, micro network system information sent by a node, where the micro network system information carries a micro network identifier and a node identifier;

accessing a micro network according to the micro network identifier and the node identifier that are carried in the micro network system information;

when a communication task is generated, determining a target resource scheduling manner in the accessed micro network according to a task type of the communication task;

obtaining a target transmission resource in the accessed micro network according to t determined target resource scheduling manner; and sending, based on the target transmission resource data that corresponds to the communication task.

With reference, to the second aspect, in a first possible implementation manner, the obtaining a target transmission resource in the accessed micro network according to the determined target resource scheduling manner includes:

when the determined target resource scheduling manner is a contention manner, determine the target transmission resource in the accessed micro network according to the micro network system information; or when the determined target resource scheduling manner is a centralized scheduling manner, sending resource request information to the node, and receiving the target transmission resource that is returned by the node based on the resource request information.

With reference to the second aspect or the first possible implementation manner of the second aspect, in a second possible implementation manner, the receiving macro network system information sent by a base station includes:

receiving, by using a system information broadcast SIB or radio resource control RRC signaling, the macro network system information sent by the base station.

With reference to the first possible implementation manner of the second aspect, in a third possible implementation manner, the macro network system information further includes: a micro network working frequency, a scheduled scheduling assignment SA resource pool, and a contention SA resource pool, where each scheduled SA resource in the scheduled SA resource pool and each contention SA resource in the contention SA resource pool are time-frequency resources in a frequency band in which the micro network working frequency is located, and the time-frequency resource is used to indicate a time-frequency location of a transmission resource and a corresponding modulation and coding scheme; or the macro network system information further includes: a micro network working frequency, a scheduled transmission resource pool, and a contention transmission resource pool, where each scheduled transmission resource in the scheduled transmission resource pool and each contention transmission resource in the contention transmission resource pool are transmission resources in a frequency band in which the micro network working frequency is located.

With reference to the third possible implementation manner of the second aspect, in a fourth possible implementation manner, when the macro network system information further includes the micro network working frequency, the scheduled SA resource pool, and the contention SA resource pool, the node transmission resource information carried in the macro network system information is a node SA resource pool, where each node SA resource in the node SA resource pool is a time-frequency resource in the frequency band in which the micro network working frequency is located, and the time-frequency resource is used to indicate a time-frequency location of a transmission resource and a corresponding modulation and coding scheme.

With reference to the third possible implementation manner of the second aspect, in a fifth possible implementation manner, when the macro network information further includes the micro network working frequency, the scheduled transmission resource pool, and the contention transmission resource pool, the node transmission resource information carried in the macro network system information is a node transmission resource pool, where each node transmission resource in the node transmission resource pool is a transmission resource in the frequency band in which the micro network working frequency is located.

With reference to the fourth possible implementation manner of the second aspect, in a sixth possible implementation manner, when the node transmission resource information carried in the macro network system information is the node SA resource pool, the determining a target node transmission resource according to the node transmission resource information includes:

searching, the node SA resources in the node SA resource pool, for at least one node SA resource that is in the specified frequency band in which the micro network working frequency is located and that includes node SA information, where when any node SA resource includes node SA information, the node is instructed to transmit the micro network system information by using a transmission resource that corresponds to the any node SA resource;

selecting, from the found at least one node SA resource, one node SA resource as a target node SA resource and determining a transmission resource that corresponds to a time-frequency location of the transmission resource indicated by the target node SA resource, and using the determined transmission resource as the target node transmission resource.

With reference to the fifth possible implementation manner of the second aspect, in a seventh possible implementation manner, when the node transmission resource information carried in the macro network system information is the node transmission resource pool, the determining a target node transmission resource according to the node transmission resource information includes:

searching the node transmission resources in the node transmission resource pool for at least one node transmission resource that is in the specified frequency band in which the micro network working frequency is located and on which the micro network system information sent by the node can be received; and selecting, from the found at least one node transmission resource, one node transmission resource as the target node transmission resource.

With reference to the fourth or the sixth possible implementation manner of the second aspect, in an eighth possible implementation manner, the micro network system information further includes: a micro network scheduled SA sending resource pool and a micro network contention SA sending resource pool, where each micro network scheduled SA sending resource in the micro network scheduled SA sending resource pool and each micro network contention SA sending resource in the micro network contention SA sending resource pool are time-frequency resources in the frequency band in which the micro network working frequency is located, and the time-frequency resource is used to indicate a time-frequency location of a transmission resource and a corresponding modulation and coding scheme.

With reference to the fifth or the seventh possible implementation manner of the second aspect, in a ninth possible implementation manner, the micro network system information further includes: a micro network scheduled sending resource pool and a micro network contention sending resource pool, where each micro network scheduled sending resource in the micro network scheduled sending resource pool and each micro network contention sending resource in the micro network contention sending resource pool are transmission resources in the frequency band in which the micro network working frequency is located.

With reference to the eighth or the ninth possible implementation manner of the second aspect, in a tenth possible implementation manner, the micro network system information further includes: a mapping relationship between a task type and a resource scheduling manner, where each task type corresponds to at least one resource scheduling manner in the mapping relationship.

With reference to any one of the third to the tenth possible implementation manners of the second aspect, in an eleventh possible implementation manner, the accessing a micro network according to the micro network identifier and the node identifier that are carried in the micro network system information includes:

completing its own configuration according to the micro network identifier and the node identifier, and establishing a connection to the node that corresponds to the node identifier.

With reference to the tenth possible implementation manner of the second aspect, in a twelfth possible implementation manner, the determining a target resource scheduling manner in the accessed micro network according to a task type of the communication task includes:

searching, according to the task type of the communication task, the mapping relationship between a task type and a resource scheduling manner for at least one resource scheduling manner that corresponds to the task type; and selecting, from the found resource scheduling manner according to a preset priority of a resource scheduling manner, one resource scheduling manner as the target resource scheduling manner.

With reference to the eighth possible implementation manner of the second aspect, in a thirteenth possible implementation manner, the determining the target transmission resource in the accessed micro network according to the micro network system information includes:

determining whether the micro network contention SA sending resource pool in the micro network system information includes an idle micro network contention SA sending resource; and if the micro network contention SA sending resource pool includes an idle micro network contention SA sending resource, selecting one micro network contention SA sending resource from the idle micro network contention SA sending resource, and determining, according to a time-frequency location of a transmission resource indicated by the selected micro network contention SA sending resource, the transmission resource that corresponds to the time-frequency location, as the target transmission resource; otherwise, selecting one idle contention SA resource from the contention SA resource pool in the macro network system information, and determining, according to a time-frequency location of a transmission resource indicated by the selected contention SA resource, the transmission resource that corresponds to the time-frequency location, as the target transmission resource.

With reference to the ninth possible implementation manner of the second aspect, in a fourteenth possible implementation manner, the determining the target transmission resource in the accessed micro network according to the micro network system information includes:

determining whether the micro network contention sending resource pool in the micro network system information includes an idle micro network contention sending resource; and if the micro network contention sending resource pool includes an micro network contention sending resource, select one or more micro network contention sending resources from the idle micro network contention sending resource, and use the selected micro network contention sending resource as the target transmission resource; otherwise, select one or more idle contention transmission resources from the contention transmission resource pool in the macro network system information, and use the selected contention transmission resource as the target transmission resource.

With reference to any one of the third to the fourteenth possible implementation manners of the second aspect, in a fifteenth possible implementation manner, the sending resource request information to the node includes:

sending the resource request information that includes task information of the communication task to the node, where the task information includes any one or a combination of the following: a task type, a task priority, or service traffic.

With reference to any one of the third to the fifteenth possible implementation manners of the second aspect, in a sixteenth possible implementation manner, the receiving the target transmission resource that is returned by the node based on the resource request information includes:

receiving resource licensing information that is returned by the node based on the resource request information and that includes the target transmission resource.

With reference to the sixteenth possible implementation manner of the second aspect, in a seventeenth possible implementation manner, a micro network scheduled SA sending resource that corresponds to a time-frequency location of the received target transmission resource belongs to the micro network scheduled SA sending resource pool; or a scheduled SA resource that corresponds to a time-frequency location of the received target transmission resource belongs to the scheduled SA resource pool.

With reference to the sixteenth possible implementation manner of the second aspect, in an eighteenth possible implementation manner, the received target transmission resource belongs to the micro network scheduled sending resource pool or the scheduled transmission resource pool.

In the embodiments of the present invention, a terminal receives macro network system information that is sent by a base station and that carries node transmission resource information, determines a target node transmission resource according to the node transmission resource information, and receives, according to the target node transmission resource, micro network system information that is sent by a node and that carries a micro network identifier and a node identifier, so as to access a micro network. When a communication task is generated, the terminal determines a target resource scheduling manner according to the communication task, obtains a target transmission resource in the accessed micro network according to the determined target resource scheduling manner, and eventually sends, based on the target transmission resource, data that corresponds to the communication task. In this way, when transmitting data for a communication task in a vehicular network system, a terminal can autonomously determine a target transmission resource, and does not need to perform multiple signaling interactions with a base station, thereby reducing signaling overheads of the base station. In addition, the base station does not need to allocate a transmission resource to the terminal for the terminal to send the data. Therefore, load of the base station is reduced, and work efficiency of the base station is increased.

DESCRIPTION OF EMBODIMENTS

Figure 1:
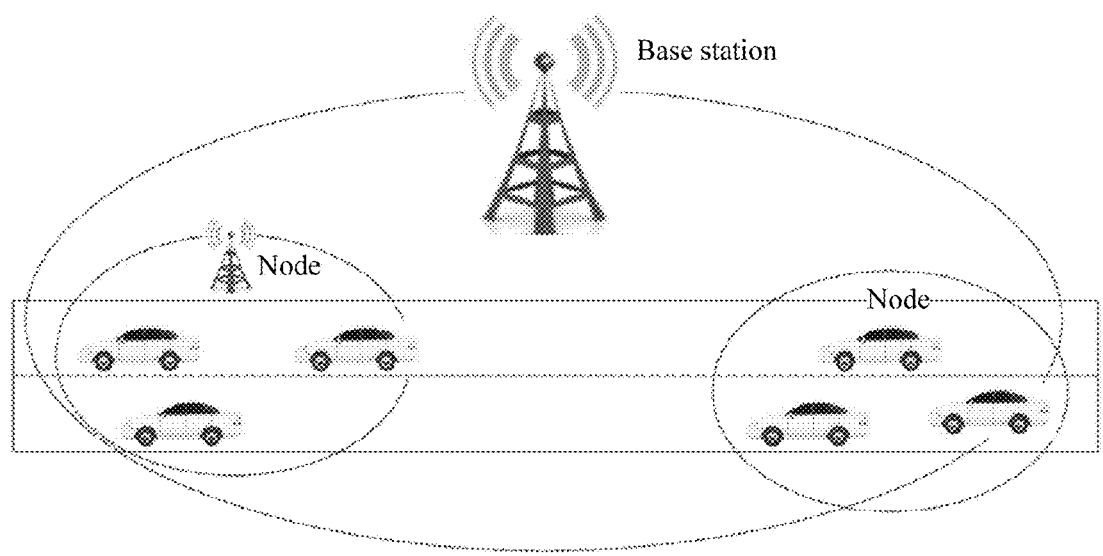
FIG. 1 is a schematic structural diagram of a vehicular network system according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a method and an apparatus for scheduling a transmission resource in a vehicular network, so as to resolve problems in the prior art that signaling overheads of a base station are increased, load of the base station is increased, and work efficiency of the base station is reduced because a manner of scheduling by the base station is used to obtain a transmission resource. The method and the apparatus are based on a same inventive concept. A problem-resolving principle of the method is similar to that of the apparatus. Therefore, mutual reference may be made between implementation of the apparatus and implementation of the method. A repeated description is not further provided.

In the prior art, when a transmission resource is obtained through scheduling by a base station, each time a terminal sends data, the terminal needs to send a report to the base station for allocation of a transmission resource, and the allocated transmission resource is notified to the terminal by using signaling. Obviously, frequent data transmission of a vehicle results in frequent signaling interactions with the base station. Consequently, signaling overheads of the base station are increased. In addition, the base station needs to allocate transmission resources multiple times. As a result, load of the base station is increased, and work efficiency of the base station is reduced. However, by means of the technical solutions in the present invention, a terminal receives and stores macro network system information sent by a base station; determines, according to the macro network system information, a node transmission resource used to send micro network system information; and receives, according to the node transmission resource, the micro network system information sent by a node, so as to access a micro network according to the micro network system information. When a communication task is generated, the terminal determines a target resource scheduling manner according to the communication task, determines a target transmission resource in the accessed micro network according to the determined target resource scheduling manner, and eventually sends, based on the target transmission resource, data that corresponds to the communication task. In this way, when transmitting data for a communication task in a vehicular network system, a terminal can autonomously determine a target transmission resource, and does not need to perform multiple signaling interactions with a base station, thereby reducing signaling overheads of the base station. In addition, the base station does not need to allocate a transmission resource to the terminal for the terminal to send the data. Therefore, load of the base station is reduced, and work efficiency of the base station is increased.

The embodiments of the present invention provide a method and an apparatus for scheduling a transmission resource in a vehicular network. The method and apparatus are applicable to a terminal device for processing V2V and V2I upper-layer service data communication in an ITS. The terminal device is a terminal such as a vehicle and infrastructure of transportation. The following describes implementation manners of the present invention in detail with reference to the accompanying drawings.

A method for scheduling a transmission resource in a vehicular network provided in an embodiment of the present invention may be used in, but is not limited to, use of an LTE technology, and another communications technology may also be used. LTE is only used as an example in this embodiment of the present invention.

Referring to FIG. 1, a vehicular network system in the method for scheduling a transmission resource in a vehicular network provided in the present invention includes a base station, a terminal (a vehicle, infrastructure of transportation, or the like), and a node. Its view of a network structure, the vehicular network system includes a macro network controlled by the base station and a micro network controlled by the node. In this embodiment, the node is referred to as a cluster head.

Because a working band of the base station is relatively low, for example, 2 GHz, the macro network controlled by the base station generally has a relatively large network coverage area. Optionally, the frequency band used by the base station may also be the same as a frequency band, for example 5.9 GHz, that is used by the terminal to perform V2V and/or V2I communication. A function of the macro network is providing system information that is needed by the terminal to perform V2V and/or V2I communication, so that the terminal may find, according to the system information, the micro network using the node (that is, the cluster head) as a control node, and when the terminal fails to establish communication with the micro network, the base station may control the terminal to perform V2V and/or V2I communication.

A working band of the micro network controlled by the node is relatively high, for example, 5.9 GHz. Therefore, network coverage of the micro network is generally smaller than that of the macro network. As shown in the figure, the node may be a static node, for example, a small cell (small cell), a road-side unit (RSU), or infrastructure of transportation, or may be a dynamic node such as a vehicle, or may be the base station. In the micro network, a transmission resource can be allocated to the terminal for the terminal to perform V2V and/or V2I communication. This reduces signaling overheads caused by interactions between the terminal and the base station, and reduces load of the base station.

Figure 2:
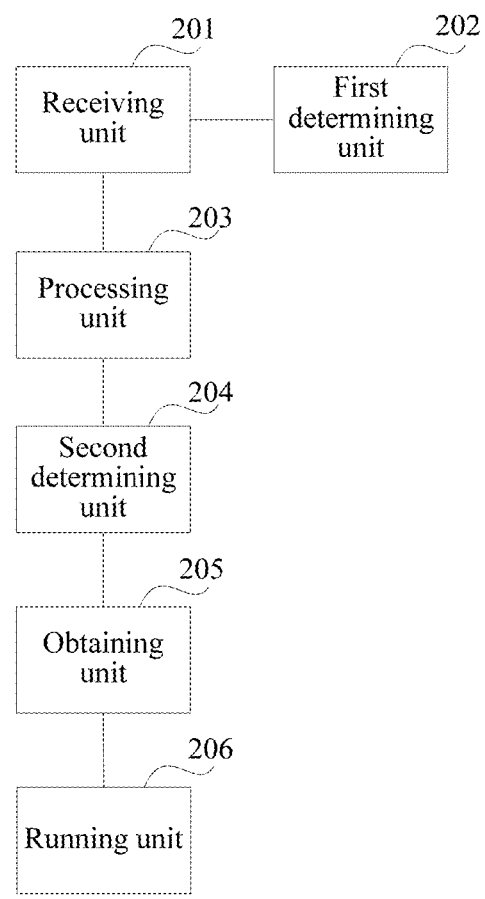
FIG. 2 is a schematic structural diagram of an apparatus for scheduling a transmission resource in a vehicular network according to an embodiment of the present invention.

An embodiment of the present invention provides an apparatus for scheduling a transmission resource in a vehicular network. The apparatus may be a terminal device for processing V2V and V2I upper-layer service data communication, in an ITS. The terminal device is a terminal such as a vehicle and infrastructure of transportation. Referring to FIG. 2, the apparatus includes: a receiving unit 201, a first determining unit 202, a processing unit 203, a second determining unit 204, an obtaining unit 205, and a running unit 206.

The receiving unit 201 is configured to: receive macro network system information sent by a base station, where the macro network system information carries node transmission resource information; and receive, according to a target node transmission resource determined by the first determining unit 202, micro network system information sent by a node, where the micro network system information carries a micro network identifier and a node identifier.

The first determining unit 202 is configured to determine the target node transmission resource according to the node transmission resource information carried in the macro network system information received by the receiving unit 201.

The processing unit 203 is configured to access a micro network according to the micro network identifier and the node identifier that are carried in the micro network system information received by the receiving unit 201.

The second determining unit 204 is configured to: when a communication task is generated, determine, according to a task type of the communication task, a target resource scheduling manner in the micro network that the processing unit 203 accesses.

The obtaining unit 205 is configured to obtain a target transmission resource in the accessed micro network according to the target resource scheduling manner determined by the second determining unit 204.

The running unit 206 is configured to send, based on the target transmission resource obtained by the obtaining unit 205, data that corresponds to the communication task.

Optionally, the acquiring unit 205 is specifically configured to:

when the determined target resource scheduling manner is a contention manner, determine the target transmission resource in the accessed micro network according to the micro network system information; or when the determined target resource scheduling manner is a centralized scheduling manner, send resource request information to the node.

Optionally, after the obtaining unit 205 sends the resource request information to the node, the receiving unit 201 is further configured to:

receive the target transmission resource that is returned by the node based on the resource request information.

Optionally, the receiving unit 201 is specifically configured to:

receive, by using a system information broadcast SIB or radio resource control RRC signaling, the macro network system information sent by the base station.

Optionally, when receiving the macro network information sent by the base station, the receiving unit 201 is specifically configured to:

receive the macro network system information that is sent by the base station and that further includes a micro network working frequency, a scheduled scheduling assignment SA resource pool, and a contention SA resource pool, where each scheduled SA resource in the scheduled SA resource pool and each contention SA resource in the contention SA resource pool are time-frequency resources in a frequency band in which the micro network working frequency is located, and the time-frequency resource is used to indicate a time-frequency location of a transmission resource and a corresponding modulation and coding scheme; or receive the macro network system information that is sent by the base station and that further includes a micro network working frequency, a scheduled transmission resource pool, and a contention transmission resource pool, where each scheduled transmission resource in the scheduled transmission resource pool and each contention transmission resource in the contention transmission resource pool are transmission resources in a frequency band in which the micro network working frequency is located.

Optionally, when receiving the node transmission resource information carried in the macro network system information sent by the base station, the receiving unit 201 is specifically configured to:

when receiving the macro network system information that is sent by the base station and that further includes the micro network working frequency, the scheduled SA resource pool, and the contention SA resource pool, further receive a node SA resource pool carried in the macro network system information sent by the base station, where each node SA resource in the node SA resource pool is a time-frequency resource in the frequency band in which the micro network working frequency is located, and the time-frequency resource is used to indicate a time-frequency location of a transmission resource and a corresponding modulation and coding scheme.

Optionally, when receiving the node transmission resource information carried in the macro network system information sent by the base station, the receiving unit 201 is specifically configured to:

when receiving the macro network system information that is sent by the base station and that further includes the micro network working frequency, the scheduled transmission resource pool, and the contention transmission resource pool, further receive a node transmission resource pool carried in the macro network system information sent by the base station, where each node transmission resource in the node transmission resource pool is a transmission resource in the frequency band in which the micro network working frequency is located.

Optionally, the first determining unit 202 is further configured to:

determine whether the node transmission resource information carried in the macro network system information received by the receiving unit 201 is the node SA resource pool; and when the first determining unit 202 determines that the node transmission resource information carried in the macro network system information is the node SA resource pool, the first determining unit 202 is specifically configured to:

search, the node SA resources in the node SA resource pool, for at least one node SA resource that is in the specified frequency band in which the micro network working frequency is located and that includes node SA information, where when any node SA resource includes node SA information, the node is instructed to transmit the micro network system information by using a transmission resource that corresponds to the any node SA resource;

select, from the found at least one node SA resource, one node SA resource as a target node SA resource; and determine a transmission resource that corresponds to a time-frequency location of the transmission resource indicated by the target node SA resource, and use the determined transmission resource as the target node transmission resource.

Optionally, the first determining unit 202 is further configured to:

determine whether the node transmission resource information carried in the macro network system information received by the receiving unit 201 is the node transmission resource pool; and when the first determining unit 202 determines that the node transmission resource information carried in the macro network system information is the node transmission resource pool, the first determining unit 202 is specifically configured to:

search the node transmission resources in the node transmission resource pool for at least one node transmission resource that is in the specified frequency band in which the micro network working frequency is located and on which the micro network system information sent by the node can be received; and select, from the found at least one node transmission resource, one node transmission resource as the target node transmission resource.

Optionally, when receiving the micro network system information sent by the node, the receiving unit 201 is specifically configured to:

receive the micro network system information that is sent by the node and that further includes a micro network scheduled SA sending resource pool and a micro network contention SA sending resource pool, where each micro network scheduled SA sending resource in the micro network scheduled SA sending resource pool and each micro network contention SA sending resource in the micro network contention SA sending resource pool are time-frequency resources in the frequency band in which the micro network working frequency is located, and the time-frequency resource is used to indicate a time-frequency location of a transmission resource and a corresponding modulation and coding scheme.

Optionally, when receiving the micro network system information sent by the node, the receiving unit 201 specifically configured to:

receive the micro network system information that is sent by the node and that further includes a micro network scheduled sending resource pool and a micro network contention sending resource pool, where each micro network scheduled sending resource in the micro network scheduled sending resource pool and each micro network contention sending resource in the micro network contention sending resource pool are transmission resources in the frequency band in which the micro network working frequency is located.

Optionally, when receiving the micro network system information sent by the node, the receiving unit 201 is specifically configured to:

receive the micro network system information that is sent by the node and that further includes a mapping relationship between a task type and a resource scheduling manner, where each task type corresponds to at least one resource scheduling manner in the mapping relationship.

Optionally, the processing unit 203 is specifically configured to:

complete its own configuration according to the micro network identifier and the node identifier, and establish a connection to the node that corresponds to the node identifier.

Optionally, when determining the target resource scheduling manner in the accessed micro network according to the task type of the communication task, the second determining unit 204 is specifically configured to:

search, according to the task type of the communication task, the mapping relationship between a task type and a resource scheduling manner for at least one resource scheduling manner that corresponds to the task type; and select, from the found resource scheduling manner according to a preset priority of a resource scheduling manner, one resource scheduling manner as the target resource scheduling manner.

Optionally, when determining the target transmission resource in the accessed micro network according to the micro network system information, the obtaining unit 205 is specifically configured to:

determine whether the micro network contention SA sending resource pool in the micro network system information includes an idle micro network contention SA sending resource; and if the micro network contention SA sending resource pool includes an idle micro network contention SA sending resource, select one micro network contention SA sending resource from the idle micro network contention SA sending resource, and determine, according to a time-frequency location of a transmission resource indicated by the selected micro network contention SA sending resource, the transmission resource that corresponds to the time-frequency location, as the target transmission resource; otherwise, select one idle contention SA resource from the contention SA resource pool in the macro network system information, and determine, according to a time-frequency location of a transmission resource indicated by the selected contention SA resource, the transmission resource that corresponds to the time-frequency location, as the target transmission resource.

Optionally, when determining the target transmission resource in the accessed micro network according to the micro network system information, the obtaining unit 205 is specifically configured to:

determine whether the micro network contention sending resource pool in the micro network system information includes an idle micro network contention sending resource; and if the micro network contention sending resource pool includes an idle micro network contention sending resource, select one or more micro network contention sending resources from the idle micro network contention sending resource, and use the selected micro network contention sending resource as the target transmission resource; otherwise, select one or more idle contention transmission resources from the contention transmission resource pool in the macro network system information, and use the selected contention transmission resource as the target transmission resource.

Optionally, when sending the resource request information to the node, the obtaining unit 205 is specifically configured to:

send the resource request information that includes task information of the communication task to the node, where the task information includes any one or a combination of the following: a task type, a task priority, or service traffic.

Optionally, when receiving the target transmission resource that is returned by the node based on the resource request information, the receiving unit 201 is specifically configured to:

receive resource licensing information that is returned by the node based on the resource request information and that includes the target transmission resource.

Optionally, when receiving the target transmission resource included in the resource licensing information, the receiving unit 201 is specifically configured to:

receive the target transmission resource included in the resource licensing information, where a micro network scheduled SA sending resource that corresponds to as time-frequency location of the target transmission resource belongs to the micro network scheduled SA sending resource pool; or receive the target transmission resource included in the resource licensing information, where a scheduled SA resource that corresponds to a time-frequency location of the target transmission resource belongs to the scheduled SA resource pool.

Optionally, when receiving the target transmission resource included in the resource licensing information, the receiving unit 201 is specifically configured to:

receive the target transmission resource that is included in the resource licensing information and that belongs to the micro network scheduled sending resource pool or the scheduled transmission resource pool.

Figure 3:
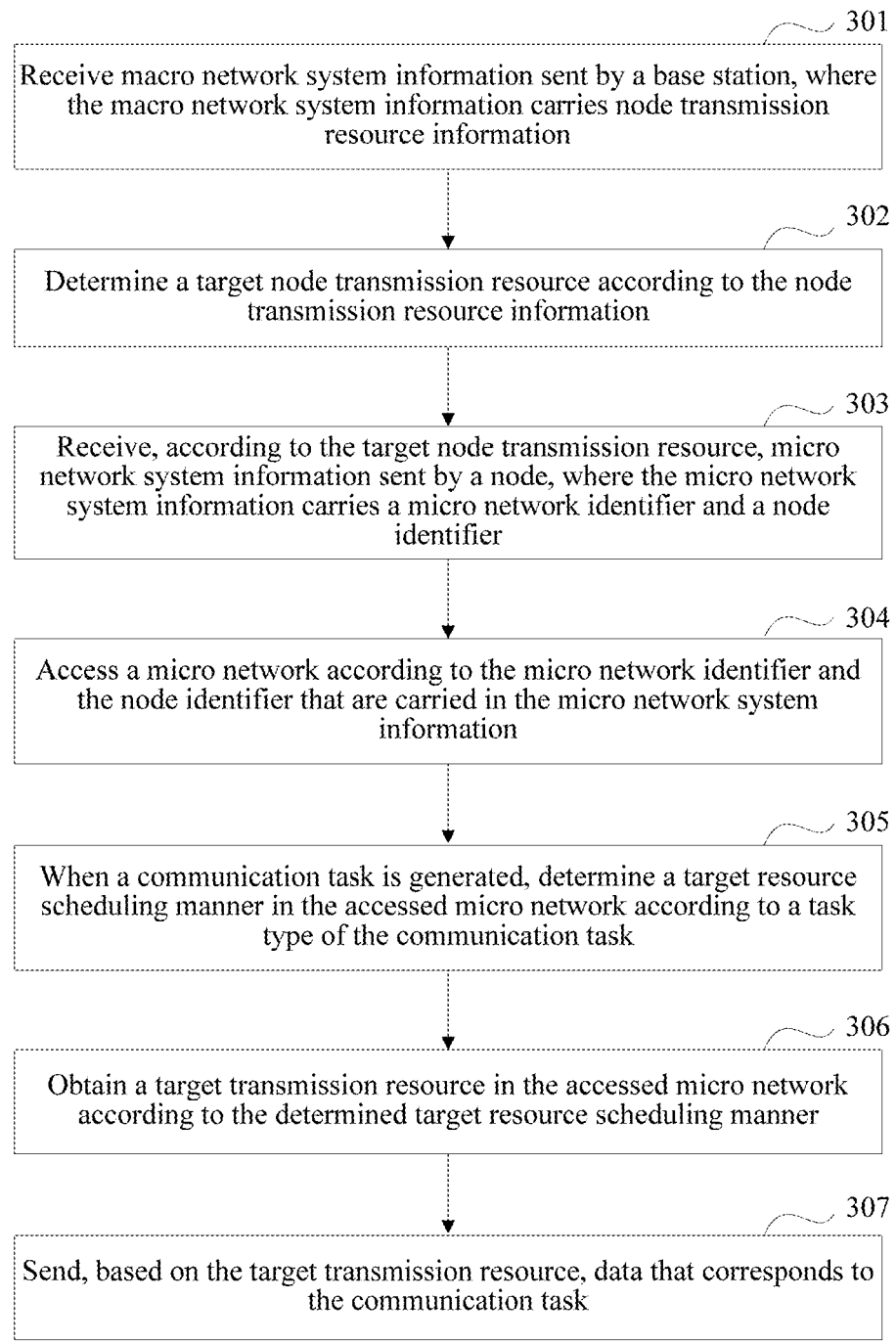
FIG. 3 is a flowchart of a method for scheduling a transmission resource in a vehicular network according to an embodiment of the present invention.

Referring to FIG. 3, an embodiment of the present invention provides a method for scheduling a transmission resource in a vehicular network. The method is applied to various terminals in a vehicular network system that include vehicles, infrastructure of transportation, or the like. A specific procedure of the method includes the following steps.

Step 301: Receive macro network system information sent by a base station, where the macro network system information carries node transmission resource information.

In this embodiment of the present invention, optionally, the base station may send the macro network system information to a terminal by using a system information broadcast (SIB) or radio resource control (RRC) signaling.

The base station sends the macro network system information to the terminal when the terminal enters a coverage region of the base station or when the terminal is turned on in a coverage region of the base station.

The macro network system information further includes: a micro network working frequency, a scheduled scheduling assignment SA resource pool, and a contention SA resource pool, where each scheduled SA resource in the scheduled SA resource pool and each contention SA resource in the contention SA resource pool are time-frequency resources in a frequency band in which the micro network working frequency is located, and the time-frequency resource is used to indicate a time-frequency location of a transmission resource and a corresponding modulation and coding scheme; or the macro network system information further includes: a micro network working frequency, a scheduled transmission resource pool, and a contention transmission resource pool, where each scheduled transmission resource in the scheduled transmission resource pool and each contention transmission resource in the contention transmission resource pool are transmission resources in a frequency band in which the micro network working frequency is located.

When the macro network information further includes the micro network working frequency, the scheduled SA resource pool, and the contention SA resource pool, the node transmission resource information carried in the macro network system information is a node SA resource pool. Each node SA resource in the node SA resource pool is a time-frequency resource in the frequency band in which the micro network working frequency is located, and the time-frequency resource is used to indicate a time-frequency location of a transmission resource and a corresponding modulation and coding scheme.

When the macro network information further includes the micro network working frequency, the scheduled transmission resource pool, and the contention transmission resource pool, the node transmission resource information carried in the macro network system information is a node transmission resource pool. Each node transmission resource in the node transmission resource pool is a transmission resource in the frequency band in which the micro network working frequency is located.

Preferably, the macro network system information may include two composition forms.

In a first composition form, the macro network system in includes, but is not limited to, a micro network working frequency, a node scheduling assignment (SA) resource pool, a scheduled SA resource pool, and a contention SA resource pool. Each node SA resource in the node SA resource pool, each scheduled SA resource in the scheduled SA resource pool, and each contention SA resource in the contention SA resource pool are time-frequency resources in the frequency band in which the micro network working frequency is located. The time-frequency resource indicates a time-frequency location of one transmission resource and a corresponding modulation and coding scheme.

In a second composition form, the macro network system information includes, but is not limited to, a micro network working frequency, a node transmission resource pool, a scheduled transmission resource pool and a contention transmission resource pool. Each node transmission resource in the node transmission resource pool, each scheduled transmission resource in the scheduled transmission resource pool, and each contention transmission resource in the contention transmission resource pool are transmission resources in the frequency band in which the micro network working frequency is located.

Optionally, the macro network system information further includes a bandwidth f a macro network.

Figure 4:
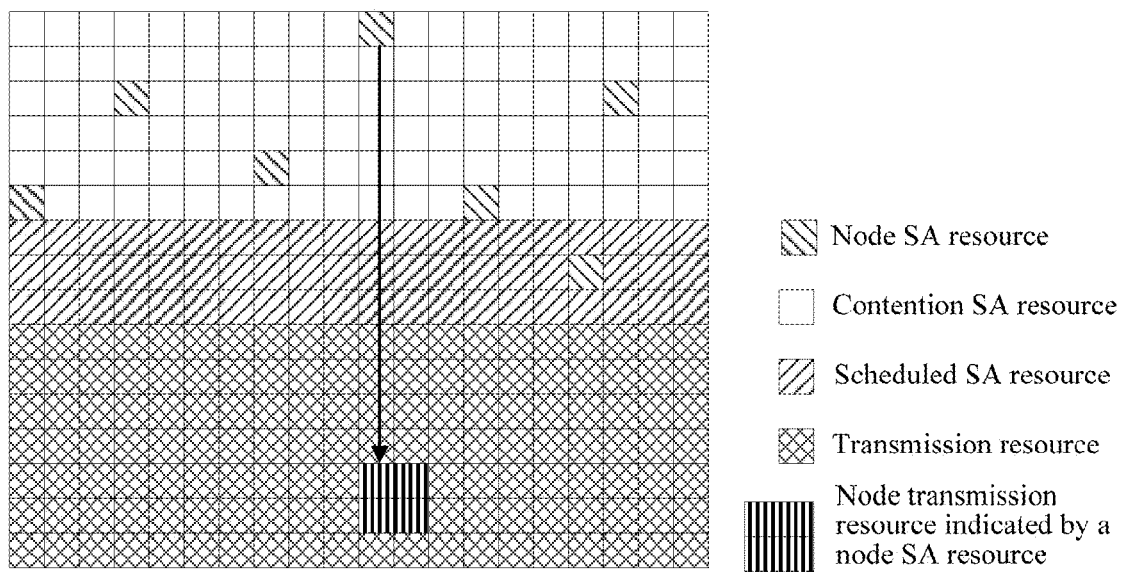
FIG. 4 shows a first manner for dividing spectrum resources in a vehicular network according to an embodiment of the present invention.

In the first composition form, referring to FIG. 4, each SA resource indicates a time-frequency location of one transmission resource and a corresponding modulation and coding scheme.

The node SA resource pool includes at least one node SA resource. Each node SA resource is one time-frequency resource in the frequency band in which the micro network working frequency is located, and each node SA resource indicates a time-frequency location of one transmission resource and a corresponding modulation and coding scheme. The transmission resource is used to send the micro network system information.

A function of the node SA resource is: The terminal may find a node SA resource including node SA information in the node SA resource pool, and search, according to an indication of the node SA resource, for corresponding micro network system information sent by one or more nodes.

The scheduled SA resource pool includes multiple specified resource blocks, that is, scheduled SA resources, in the frequency band in which the micro network working frequency is located. Similar to each node SA resource in the node SA resource pool, each scheduled SA resource indicates a time-frequency location of one transmission resource and a modulation and coding scheme, and the terminal can use the transmission resource that corresponds to the scheduled SA resource to transmit data only when the scheduled SA resource is allocated to the terminal by a node.

A function of the scheduled SA resource is: When the terminal sends V2V/V2I information in a centralized scheduling manner, after obtaining a scheduled SA resource allocated by a node, the terminal sends, on a transmission resource specified by the scheduled SA resource, the V2V/V2I information that needs to be sent. When the terminal receives V2V/V2I information in a centralized scheduling manner, the terminal needs to listen to a scheduled SA resource in the scheduled SA resource pool, to obtain V2V/V2I information that is sent by another nearby terminal by using such a scheduled SA resource.

The contention SA resource pool includes multiple specified resource blocks, that is, contention SA resources, in the frequency band in which the micro network working frequency is located. Similar to SA resources in the node SA resource pool and the scheduled SA resource pool, each contention SA resource also indicates a time-frequency location of one transmission resource and a modulation and coding scheme, and the terminal needs to preempt such a contention SA resource with another nearby terminal in a contention manner.

A function of the contention SA resource is: When the terminal sends V2V/V2I information in a contention manner, after obtaining a contention SA resource by means of contention, the terminal sends, on a transmission resource specified by the contention SA resource, the V2V/V2I information that needs to be sent. When the terminal receives V2V/V2I information in a contention manner, the terminal needs to listen to a contention SA resource in the contention SA resource pool, to obtain V2V/V2I information that is sent by another nearby terminal by using such a contention SA resource.

Figure 5:
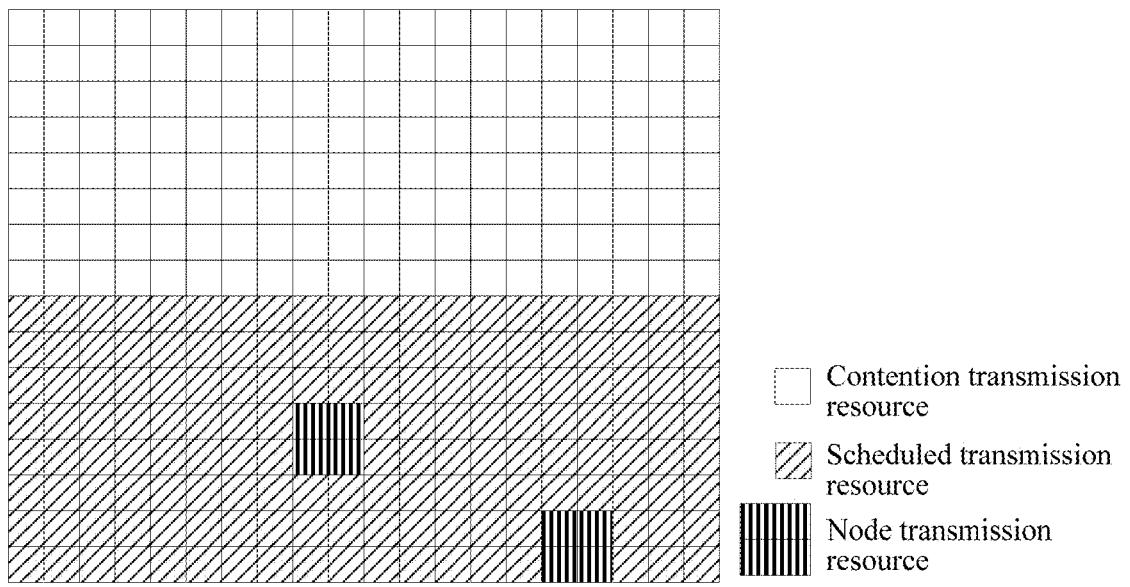
FIG. 5 shows a second manner for dividing spectrum resources in a vehicular network according to an embodiment of the present invention.

In a second composition form, referring to FIG. 5:

The node transmission resource pool includes at least one node transmission resource, each node transmission resource is one time-frequency resource in the frequency band in which the micro network working frequency is located, and each node resource is used to send the micro network system information.

A function of the node transmission resource is: The terminal may search the node transmission resource pool for one or more node transmission resources on which micro network system information sent by a node can be received, and obtain, by listening to the node transmission resources, micro network system information sent by one or more nodes.

The scheduled transmission resource pool includes multiple specified resource blocks, that is, scheduled SA resources, in the frequency band in which the micro network working frequency is located. The terminal can use the scheduled transmission resource to transmit data only when such a scheduled transmission resource is allocated to the terminal by a nearby node.

A function of the scheduled transmission resource is: When the terminal sends V2V/V2I information in a centralized scheduling manner, after obtaining a scheduled transmission resource through staged allocation, the terminal sends, on the scheduled transmission resource, the V2V/V2I information that needs to be sent. When the terminal receives V2V1V2I information in a centralized scheduling manner, the terminal needs to listen to a scheduled transmission resource in the scheduled transmission resource pool, to obtain V2V/V2I information that is sent by another nearby terminal by using such a scheduled transmission resource.

The contention transmission resource pool includes multiple specified resource blocks, that is, contention transmission resources, in the frequency band in which the micro network working frequency is located. The terminal needs to preempt such a contention transmission resource with another nearby terminal in a contention manner.

A function of the contention transmission resource is: When the terminal sends V2V/V2I information in a contention manner, after obtaining a contention transmission resource by means of contention, the terminal sends, on the contention transmission resource, the V2V/V2I information that needs to be sent. When the terminal receives V2V/V2I information in a contention manner, the terminal needs to listen to a contention resource location of a contention transmission resource, to obtain V2V/V2I information that is sent by another nearby terminal by using such a contention transmission resource.

Step 302: Determine a target node transmission resource according to the node transmission resource information.

Specifically, when the node transmission resource information carried in the macro network system information is the node SA resource pool, the determining a target node transmission resource according to the node transmission resource information includes:

searching, the node SA resources in the node SA resource pool, for at least one node SA resource that is in the specified frequency band in which the micro network working frequency is located and that includes node SA information, where when any node SA resource includes node SA information, the node is instructed to transmit the micro network system information by using a transmission resource that corresponds to the any node SA resource;

selecting, from the found at least one node SA resource, one node SA resource as a target node SA resource; and determining a transmission resource that corresponds to a time-frequency location of the transmission resource indicated by the target node SA resource, and using the determined transmission resource as the target node transmission resource.

Specifically, when the node transmission resource information carried in the macro network system information is the node transmission resource pool, the determining a target node transmission resource according to the node transmission resource information includes:

searching the node transmission resources in the node transmission resource pool for at least one node transmission resource that is in the specified frequency band in which the micro network working frequency is located and on which the micro network system information sent by the node can be received; and selecting, from the found at least one node transmission resource, one node transmission resource as the target node transmission resource.

Step 303: Receive, according to the target node transmission resource, micro network system information sent by a node, where the micro network system information carries a micro network identifier and a node identifier.

When a composition form of the macro network system information received by the terminal is the first composition form, the first type of micro network system information further includes: a micro network scheduled SA sending resource pool and a micro network contention SA sending resource pool. Each micro network scheduled SA sending resource in the micro network scheduled SA sending resource pool and each micro network contention SA sending resource in the micro network contention SA sending resource pool are time-frequency resources in the frequency band in which the micro network working frequency is located, and the time-frequency resource is used to indicate a time-frequency location of a transmission resource and a corresponding modulation and coding scheme.

When a composition form of the macro network system information received by the terminal is the second composition form, the second type of micro network system information further includes: a micro network scheduled sending resource pool and a micro network contention sending resource pool. Each micro network scheduled sending resource in the micro network scheduled sending resource pool and each micro network contention sending resource in the micro network contention sending resource pool are transmission resources in the frequency band in which the micro network working frequency is located.

Regardless of whether composition of the micro network system information is the first composition form or the second composition form, the micro network system information may further include a mapping relationship between a task type and a resource scheduling manner, and each task type corresponds to at least one resource scheduling manner in the mapping relationship. Specifically, the mapping relationship specifies a set of service types that need to be sent in the centralized scheduling manner and a set of service types that need to be sent in the contention manner, and a same type of service may also be sent in both the sending manners.

Step 304: Access a micro network according to the micro network identifier and the node identifier that are carried in the micro network system information.

Specifically, a process of step 304 includes:
completing its own configuration according to the micro network identifier and the node identifier, and establishing a connection to the node that corresponds to the node identifier.

Step 305: When a communication task is generated, determine a target resource scheduling manner in the accessed micro network according to a task type of the communication task.

If the communication task is that the terminal needs to send V2V/V2I information, the V2V/V2I information may include, but is not limited to, any one or a combination of the following information: a speed of a vehicle, a driving direction, a specific location, or whether emergent braking is performed. When the terminal has an upper-layer V2V/V2I communication service, a task type of the communication task is determined first, and the mapping relationship between a task type and a resource scheduling manner is then searched according to the task type for at least one resource scheduling manner that corresponds to the task type.

From the found resource scheduling manner according to a preset priority of a resource scheduling manner, one resource scheduling manner is selected as the target resource scheduling manner.

The mapping relationship may be added to the micro network system information sent by the node and is sent to the terminal, as described in step 303. Alternatively, the mapping relationship may be prestored in the terminal, or may be sent by the base station to the terminal. No specific limitation is imposed in this embodiment of the present invention.

Step 306: Obtain a target transmission resource in the accessed micro network according to the determined target resource scheduling manner.

Specifically, step 306 includes the following two cases:
a first case: when the determined target resource scheduling manner is a contention manner, the target transmission resource in the accessed micro network is determined according to the micro network system information; and a second case: when the determined target resource scheduling manner is a centralized scheduling manner, resource request information is sent to the node, and the target transmission resource that is returned by the node based on the resource request information is received.

Specifically, when the determined target resource scheduling manner is a contention manner, the target transmission resource in the accessed micro network is determined according to the micro network system information, and according to composition manners of the micro network system information, there are two cases, which specifically include:

when a composition form of the micro network system information is the first composition form, that is, the composition form of the macro network system information is also the first composition form, determining whether the micro network contention SA sending resource pool in the micro network system information includes an idle micro network contention SA sending resource; and if the micro network contention SA sending resource pool includes an idle micro network contention SA sending resource, selecting one micro network contention SA sending resource from the idle micro network contention SA sending resource, and determining, according to a time-frequency location of a transmission resource indicated by the selected micro network contention SA sending resource, the transmission resource that corresponds to the time-frequency location, as the target transmission resource; otherwise, selecting one idle contention SA resource from the contention SA resource pool in the macro network system information, and determining, according to a time-frequency location of a transmission resource indicated by the selected contention SA resource, the transmission resource that corresponds to the time-frequency location, as the target transmission resource; and when a composition form of the micro network system information is the second composition form, that is, the composition form of the macro network system information is also the second composition form, determining whether the micro network contention sending resource pool in the micro network system information includes an idle micro network contention sending resource; and if the micro network contention sending resource pool includes an idle micro network contention sending resource, selecting one or more micro network contention sending resources from the idle micro network contention sending resource, and using the selected micro network contention sending resource as the target transmission resource; otherwise, selecting one or more idle contention transmission resources from the contention transmission resource pool in the macro network system information, and using the selected contention transmission resource as the target transmission resource.

Specifically, when the target resource scheduling manner is the centralized scheduling manner, the resource request information is sent to the node, and the target transmission resource that is returned by the node based on the resource request information is received.

The sending resource request information to the node includes: sending the resource request information that includes task information of the communication task to the node, where the task information includes any one or a combination of the following: a task type, a task priority, or service traffic.

In an actual application, the resource request information is referred to as buffer status request information. The information is used to request, from the node, a transmission resource used to transmit a previous service.

Optionally, the resource request information may be added by the terminal to a Media Access Control protocol data unit (MAC PDU) and sent through broadcasting. A packet header of the MAC PDU carries the node identifier, and the node identifier may be used as a target address, so that the node may receive the MAC PDU.

Optionally, the terminal may send the MAC PDU in a contention manner.

After receiving the MAC PDU, the node determines, according to the resource request information or the like, a licensed scheduled transmission resource, adds the scheduled transmission resource as the target transmission resource to resource licensing information, and returns the resource licensing information to the terminal. The terminal then receives the resource licensing information that is returned by the node based on the resource request information and that includes the target transmission resource.

Specifically, when the composition form of the micro network system information is the first composition form, that is, the composition form of the macro network system information is also the first composition form, a micro network scheduled SA sending resource that corresponds to a time-frequency location of the received target transmission resource belongs to the micro network scheduled SA sending resource pool; or a scheduled SA resource that corresponds to a time-frequency location of the received target transmission resource belongs to the scheduled SA resource pool.

When the composition form of the micro network system information is the second composition form, that is, the composition form of the macro network system information is also the second composition form, the received target transmission resource belongs to the micro network scheduled sending resource pool or the scheduled transmission resource pool.

Step 307: Send, based on the target transmission resource, data that corresponds to the communication task.

When performing V2V/V2I communication, the terminal sends the data, for example, a speed of a vehicle or a driving direction, of the communication task by using the target transmission resource.

Figure 6:
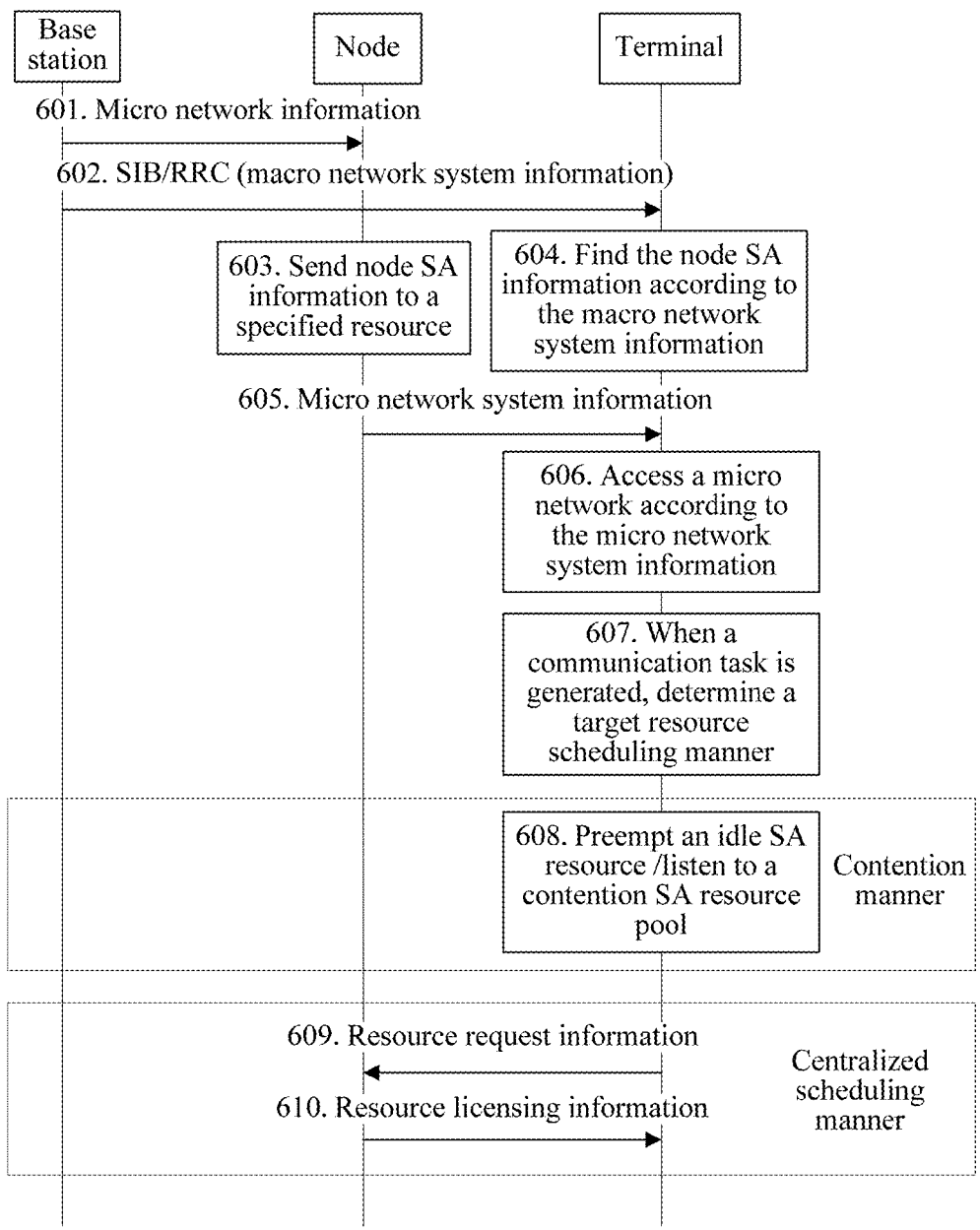
FIG. 6 is a specific flowchart of a method for scheduling a transmission resource in a vehicular network according to an embodiment of the present invention.

Referring to FIG. 6, based on the foregoing embodiments, the present invention provides a method for scheduling a transmission resource in a vehicular network. A specific procedure of the method includes the following steps:

Step 601: A base station first allocates corresponding micro network information to each node, and sends the micro network information to the corresponding node.

Specifically, the micro network information is, for example, a micro network identifier, a node identifier, a micro network scheduled SA sending resource pool, and a micro network contention SA sending resource pool.

Step 602: When a terminal moves to a coverage region of the base station or a terminal is turned on in a coverage region of the base station, the base station sends macro network system information to the terminal by using a SIB or RRC signaling.

The macro network system information includes at least: a micro network working frequency, a node SA resource pool, a scheduled SA resource pool, and a contention SA resource pool.

Step 603: A node sends node SA information to a node SA resource in a node SA resource pool.

Sending the node SA information to a node SA resource represents that the node uses a transmission resource indicated by the node SA resource to send micro network system information.

Step 604: The terminal receives and stores the macro network system information, and finds, from the node SA resource pool in the macro network system information, a node SA resource that includes the node SA information.

Step 605: The node sends micro network system information to the terminal by using a transmission resource that is indicated by the node SA resource including the node SA information.

The micro network system information includes at least a micro network identifier, a node identifier, a micro network scheduled SA sending resource pool, and a micro network contention SA sending resource pool.

Optionally, the micro network system information may further include: a mapping relationship between a task type and a resource scheduling manner, where each task type corresponds to at least one resource scheduling manner in the mapping relationship.

Step 606: The terminal accesses a micro network according to the received micro network system information.

Specifically, the terminal completes its own configuration according to the micro network identifier and the node identifier, and establishes a connection to the node that corresponds to the node identifier.

Step 607: When a communication task is generated, the terminal determines a target resource scheduling manner according to a task type of the communication task.

The terminal determines, according to the task type of the communication task and the mapping relationship between a task type and a resource scheduling manner, a resource scheduling manner that corresponds to the task type. When the task type in the mapping relationship corresponds to one resource scheduling manner, the resource scheduling manner is used as the target resource scheduling manner. When the task type in the mapping relationship corresponds to two resource scheduling manners, a resource scheduling manner with a higher priority is selected as the target resource scheduling manner.

Generally, a priority of a contention manner is higher than a priority of a centralized scheduling manner.

Step 608: When it is determined that the target resource scheduling manner is a contention manner, first preempt an idle micro network contention SA sending resource in a micro network contention SA sending resource pool in the micro network system information, and preempt an idle contention SA resource in a contention SA resource pool in the macro network system information when no idle micro network contention SA sending resource exists.

After the resource preemption, the data of the communication task is sent by using a transmission resource indicated by the preempted resource.

Step 609: When the determined target resource scheduling manner is a centralized scheduling manner, the terminal sends a resource request information to the node.

The resource request information includes task information of the communication task, and the task information may include any one or a combination of the following: a task type, a task priority, or service traffic.

Step 610: The node determines, according to task information of the communication task included in the received resource request information, a transmission resource allocated to the terminal, and sends the transmission resource to the terminal by using resource licensing information.

Specifically, a scheduled SA resource that corresponds to a time-frequency location of the transmission resource belongs to the micro network scheduled SA sending resource pool or the scheduled SA resource pool.

Figure 7:
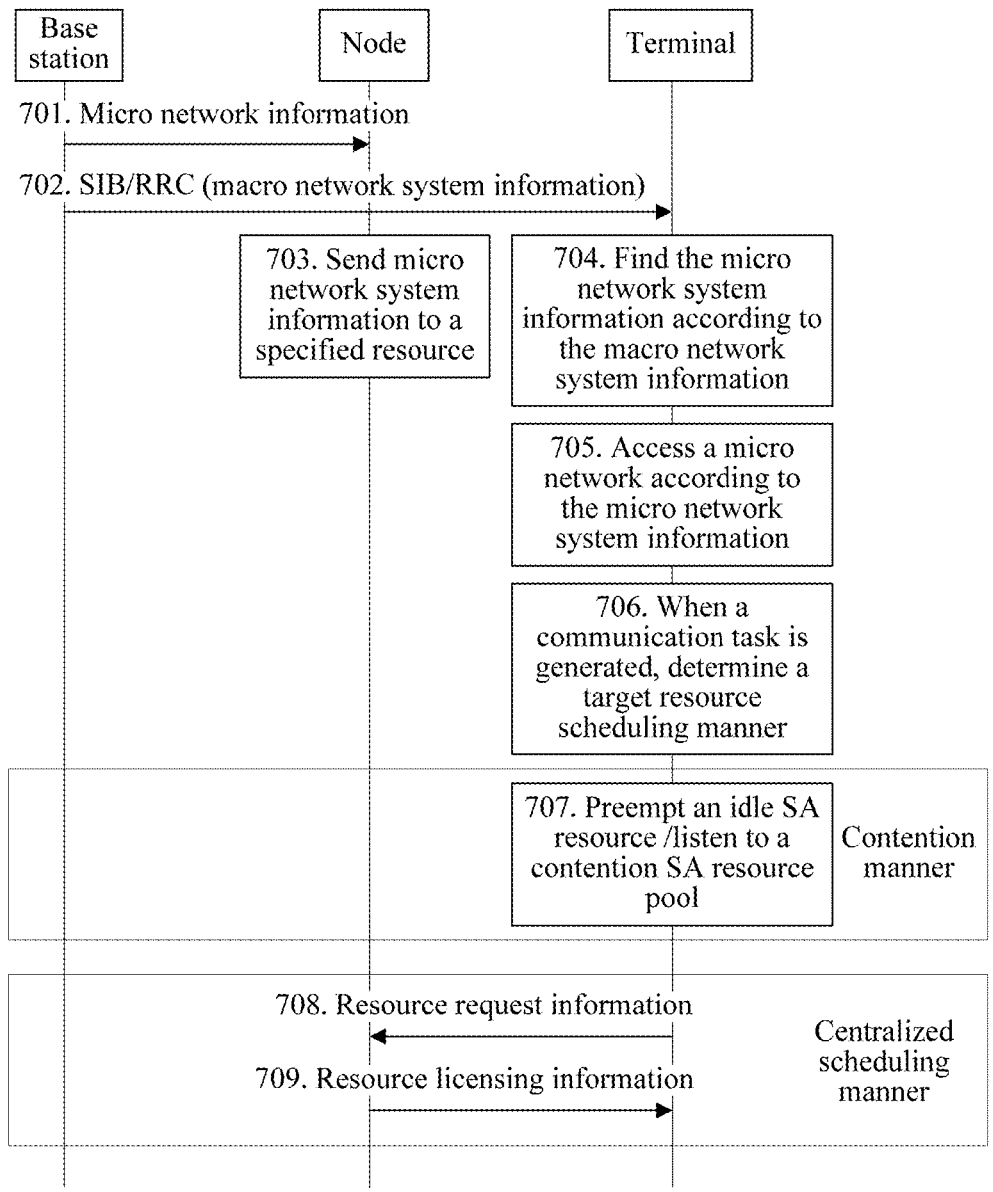
FIG. 7 is a specific flowchart of a method for scheduling a transmission resource in a vehicular network according to an embodiment of the present invention.

Referring to FIG. 7, based on the foregoing embodiments, the present invention provides another method for scheduling a transmission resource in a vehicular network. A specific procedure of the method includes the following steps:

Step 701: A base station first allocates corresponding micro network information to each node, and sends the micro network information to the corresponding node.

Specifically, the micro network information is, for example, a micro network identifier, a node identifier, a micro network scheduled sending resource pool, and a micro network contention sending resource pool.

Step 702: When a terminal moves to a coverage region of the base station or a terminal is turned on in a coverage region of the base station, the base station sends macro network system information to the terminal by using a SIB or RRC signaling.

The macro network system information includes at least: a micro network working frequency, a node transmission resource pool, a scheduled transmission resource pool, and a contention transmission resource pool.

Step 703: A node sends micro network system information by using a specified node transmission resource in a node transmission resource pool.

Step 704: The terminal finds a node transmission resource on which the micro network system information can be sent, and receive the micro network system information by using the node transmission resource.

The micro network system information includes at least a micro network identifier, a node identifier, a micro network scheduled sending resource pool, and a micro network contention sending resource pool.

Optionally, the micro network system information may further include: a mapping relationship between a task type and a resource scheduling manner, where each task type corresponds to at least one resource scheduling manner in the mapping relationship.

Step 705: The terminal accesses a micro network according to the received micro network system information.

Specifically, the terminal completes its own configuration according to the micro network identifier and the node identifier, and establishes a connection to the node that corresponds to the node identifier.

Step 706: When a communication task is generated, the terminal determines a target resource scheduling manner according to a task type of the communication task.

The terminal determines, according to the task type of the communication task and the mapping relationship between a task type and a resource scheduling manner, a resource scheduling manner that corresponds to the task type. When the task type in the mapping relationship corresponds to one resource scheduling manner, the resource scheduling manner is used as the target resource scheduling manner. When the task type in the mapping relationship corresponds to two resource scheduling manners, a resource scheduling manner with a higher priority is selected as the target resource scheduling manner.

Generally, a priority of a contention manner is higher than a priority of a centralized scheduling manner.

Step 707: When it is determined that the target resource scheduling manner is a contention manner, first preempt an idle micro network contention sending resource in a micro network contention sending resource pool in the micro network system information, and preempt an idle contention transmission resource in a contention transmission resource pool in the macro network system information when no idle micro network contention sending resource exists.

After the resource preemption, the data of the communication task is sent by using the preempted resource.

Step 708: When the determined target resource scheduling manner is a centralized scheduling manner, the terminal sends a resource request information to the node.

The resource request information includes task information of the communication task, and the task information may include any one or a combination of the following: a task type, a task priority, or service traffic.

Step 709: The node determines, according to task information of the communication task included in the received resource request information, a transmission resource allocated to the terminal, and sends the transmission resource to the terminal by using resource licensing information.

Specifically, the transmission resource belongs to the micro network scheduled sending resource pool or the scheduled transmission resource pool.

Figure 8:
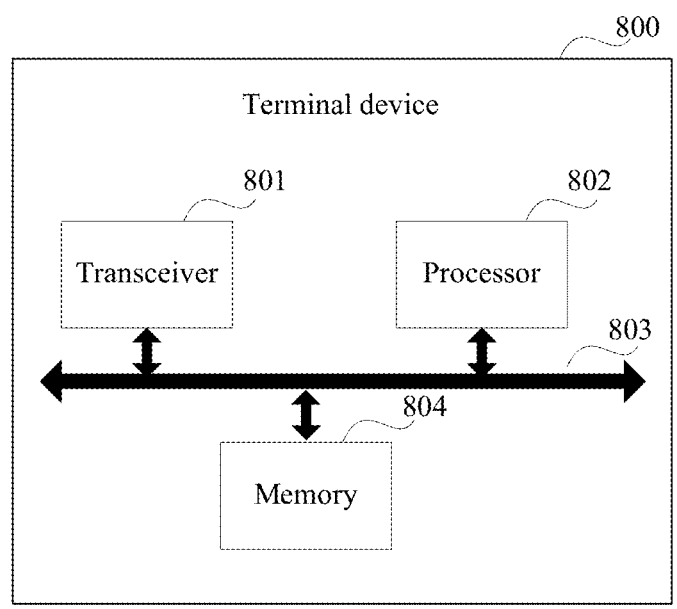
FIG. 8 is a schematic structural diagram of a terminal device according to an embodiment of the present invention.

Based on the foregoing embodiments, referring to FIG. 8, an embodiment of the present invention further provides a terminal device. The terminal device includes: a transceiver 801, a processor 802, a bus 803, and a memory 804.

The transceiver 801, the processor 802, and the memory 804 are connected to each other through the bus 803. The bus 803 may be a Peripheral Component Interconnect (Peripheral Component Interconnect, PCI) bus, an Extended Industry Standard Architecture (Extended Industry Standard Architecture, EISA for short) bus, or the like. The bus may be classified as an address bus, a data bus, a control bus, or the like. For ease of representation, the bus is represented in FIG. 8 by using only one bold line, but it does not indicate that there is only one bus or only one type of bus.

The transceiver 801 is configured to: receive macro network system information sent by a base station; receive micro network system information sent by a node; and send resource request information to the node, and receive a target transmission resource that is returned by the node based on the resource request information.

The processor 802 is configured to implement the method for scheduling a transmission resource in a vehicular network shown in FIG. 3 in this embodiment of the present invention, where the method includes:

receiving the macro network system information sent by the base station, where the macro network system information carries node transmission resource information;

determining a target node transmission resource according to the node transmission resource information;

receiving, according to the target node transmission resource, the micro network system information sent by the node, where the micro network system information carries a micro network identifier and a node identifier;

accessing a micro network according to the micro network identifier and the node identifier that are carried in the micro network system information;

when a communication task is generated, determining a target resource scheduling manner in the accessed micro network according to a task type of the communication task;

obtaining the target transmission resource in the accessed micro network according to the determined target resource scheduling manner; and sending, based on the target transmission resource, data that corresponds to the communication task.

Optionally, the obtaining, by the processor 802, the target transmission resource in the accessed micro network according to the determined target resource scheduling manner includes:

when the determined target resource scheduling manner is a contention manner, determining the target transmission resource in the accessed micro network according to the micro network system information; or when the determined target resource scheduling manner is a centralized scheduling manner, sending resource request information to the node, and receiving the target transmission resource that is returned by the node based on the resource request information.

Optionally, the receiving, by the processor 802, the macro network system information sent by the base station includes:

receiving, by using a system information broadcast SIB or radio resource control RRC signaling, the macro network system information sent by the base station.

Optionally, the macro network system information further includes: a micro network working frequency, a scheduled scheduling assignment SA resource pool, and a contention SA resource pool, where each scheduled SA resource in the scheduled SA resource pool and each contention SA resource in the contention SA resource pool are time-frequency resources in a frequency band in which the micro network working frequency is located, and the time-frequency resource is used to indicate a time-frequency location of a transmission resource and a corresponding modulation and coding scheme; or the macro network system information further includes: a micro network working frequency, a scheduled transmission resource pool, and a contention transmission resource pool, where each scheduled transmission resource in the scheduled transmission resource pool and each contention transmission resource in the contention transmission resource pool are transmission resources in a frequency band in which the micro network working frequency is located.

Optionally, when the macro network information further includes the micro network working frequency, the scheduled SA resource pool, and the contention SA resource pool, the node transmission resource information carried in the macro network system information is a node SA resource pool. Each node SA resource in the node SA resource pool is a time-frequency resource in the frequency band in which the micro network working frequency is located, and the time-frequency resource is used to indicate a time-frequency location of a transmission resource and a corresponding modulation and coding scheme.

Optionally, when the macro network information further includes the micro network working frequency, the scheduled transmission resource pool, and the contention transmission resource pool, the node transmission resource information carried in the macro network system information is a node transmission resource pool. Each node transmission resource in the node transmission resource pool is a transmission resource in the frequency band in which the micro network working frequency is located.

Optionally, when the node transmission resource information carried in the macro network system information is the node SA resource pool, the determining, by the processor 802, a target node transmission resource according to the node transmission resource information includes:

searching, the node SA resources in the node SA resource pool, for at least one node SA resource that is in the specified frequency band in which the micro network working frequency is located and that includes node SA information, where when any node SA resource includes node SA information, the node is instructed to transmit the micro network system information by using a transmission resource that corresponds to the any node SA resource;

selecting, from the found at least one node SA resource, one node SA resource as a target node SA resource; and determining a transmission resource that corresponds to a time-frequency location of the transmission resource indicated by the target node SA resource, and using the determined transmission resource as the target node transmission resource.

Optionally, when the node transmission resource information carried in the macro network system information is the node transmission resource pool, the determining, by the processor 802, a target node transmission resource according to the node transmission resource information includes:

searching the node transmission resources in the node transmission resource pool for at least one node transmission resource that is in the specified frequency band in which the micro network working frequency is located and on which the micro network system information sent by the node can be received; and selecting, from the found at least one node transmission resource, one node transmission resource as the target node transmission resource.

Optionally, the micro network system information further includes: a micro network scheduled SA sending resource pool and a micro network contention SA sending resource pool, where each micro network scheduled SA sending resource in the micro network scheduled SA sending resource pool and each micro network contention SA sending resource in the micro network contention SA sending resource pool are time-frequency resources in the frequency band in which, the micro network working frequency is located, and the time-frequency resource is used to indicate a time-frequency location of a transmission resource and a corresponding modulation and coding scheme.

Optionally, the micro network system information further includes: a micro network scheduled sending resource pool and a micro network contention sending resource pool, where each micro network scheduled sending resource in the micro network scheduled sending resource pool and each micro network contention sending resource in the micro network contention sending resource pool are transmission resources in the frequency band in which the micro network working frequency is located.

Optionally, the micro network system information further includes: a mapping relationship between a task type and a resource scheduling manner, where each task type corresponds to at least one resource scheduling manner in the mapping relationship.

Optionally, the accessing, by the processor 802, a micro network according to the micro network identifier and the node identifier that are carried in the micro network system information includes:

completing its own configuration according to the micro network identifier and the node identifier, and establishing a connection to the node that corresponds to the node identifier.

Optionally, the determining, by the processor 802, a target resource scheduling manner in the accessed micro network according to a task type of the communication task includes:

searching, according to the task type of the communication task, the mapping relationship between a task type and a resource scheduling manner for at least one resource scheduling manner that corresponds to the task type; and selecting, from the found resource scheduling manner according to a preset priority of a resource scheduling manner, one resource scheduling manner as the target resource scheduling manner.

Optionally, the determining, by the processor 802, the target transmission resource in the accessed micro network according to the micro network system information includes:

determining whether the micro network contention SA sending resource pool in the micro network system information includes an idle micro network contention SA sending resource; and if the micro network contention SA sending resource pool includes an idle micro network contention SA sending resource, selecting one micro network contention SA sending resource from the idle micro network contention SA sending resource, and determining, according to a time-frequency location of a transmission resource indicated by the selected micro network contention SA sending resource, the transmission resource that corresponds to the time-frequency location, as the target transmission resource; otherwise, selecting one idle contention SA resource from the contention SA resource pool in the macro network system information, and, determining, according to a time-frequency location of a transmission resource indicated by the selected contention SA resource, the transmission resource that corresponds to the time-frequency location, as the target transmission resource.

Optionally, the determining, by the processor 802, the target transmission resource in the accessed micro network according to the micro network system information includes:

determining whether the micro network contention sending resource pool in the micro network system information includes an idle micro network contention sending resource; and if the micro network contention sending resource pool includes an idle micro network contention sending resource, selecting one or more micro network contention sending resources from the idle micro network contention sending resource, and using the selected micro network contention sending resource as the target transmission resource; otherwise selecting one or more idle contention transmission resources from the contention transmission resource pool in the macro network system information, and using the selected contention transmission resource as the target transmission resource.

Optionally, the sending, by the processor 802, resource request information to the node includes:

sending the resource request information that includes task information of the communication task to the node, where the task information includes any one or a combination of the following; a task type, a task priority, or service traffic.

Optionally, the receiving, by the processor, the target transmission resource that is returned by the node based on the resource request information includes:

receiving resource licensing information that is returned by the node based on the resource request information and that includes the target transmission resource.

Optionally, a micro network scheduled SA sending resource that corresponds to a time-frequency location of the received target transmission resource belongs to the micro network scheduled SA sending resource pool; or a scheduled SA resource that corresponds to a time-frequency location of the received target transmission resource belongs to the scheduled SA resource pool.

Optionally, the received target transmission resource belongs to the micro network scheduled sending resource pool or the scheduled transmission resource pool.

The terminal device 800 further includes the memory 804, configured to store a program or the like. Specifically, the program may include program code, where the program code includes a computer operation instruction. The memory 804 may include a random access memory (random access memory, RAM), or may include a non-volatile memory (non-volatile memory), such as at least one magnetic disk memory. The processor 802 executes an application program stored in the memory 804, to implement the foregoing method for scheduling a transmission resource in a vehicular network.

In conclusion, according to the method and apparatus for scheduling a transmission resource in a vehicular network that are provided in the embodiments of the present invention, in the method, a terminal receives macro network system information that is sent by a base station and that carries node transmission resource information, determines a target node transmission resource according to the node transmission resource information, and receives, according to the target node transmission resource, micro network system information that is sent by a node and that carries a micro network identifier and a node identifier, so as to access a micro network. When a communication task is generated, the terminal determines a target resource scheduling manner according to the communication task, obtains a target transmission resource in the accessed micro network according to the determined target resource scheduling manner, and eventually sends, based on the target transmission resource, data that corresponds to the communication task. In this way, when transmitting data for a communication task in a vehicular network system, a terminal can autonomously determine a target transmission resource, and does not need to perform multiple signaling interactions with a base station, thereby reducing signaling overheads of the base station. In addition, the base station does not need to allocate a transmission resource to the terminal for the terminal to send the data. Therefore, load of the base station is reduced, and work efficiency of the base station is increased.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An apparatus for a vehicular network, the apparatus comprising:
   a receiver, configured to:
      receive macro network system information sent by a base station remotely located from the apparatus, wherein the macro network system information carries node transmission resource information, and
      receive, according to a target node transmission resource determined by a processor, micro network system information sent by a node, wherein the micro network system information carries a micro network identifier and a node identifier of the node;
   the processor, configured to:
      determine the target node transmission resource according to the node transmission resource information carried in the macro network system information received by the receiver,
      access a micro network according to the micro network identifier and the node identifier that are carried in the micro network system information received by the receiver,
      when a communication task is generated, determine, according to a task type of the communication task, a target resource scheduling manner in the micro network that the processor accesses, and
      obtain, independently of the base station, a target transmission resource in the accessed micro network according to the determined target resource scheduling manner; and
   a transmitter, configured to send, based on the target transmission resource, data that corresponds to the communication task,
   wherein the target node transmission resource and the target transmission resource are among a plurality of transmission resources in the vehicular network.

2. The apparatus according to claim 1, wherein the processor is configured to:
   when the determined target resource scheduling manner is a contention manner, determine the target transmission resource in the accessed micro network according to the micro network system information, or
   when the determined target resource scheduling manner is a centralized scheduling manner, control the transmitter to send resource request information to the node.

3. The apparatus according to claim 2, wherein
   the processor is configured to, when the determined target resource scheduling manner is the centralized scheduling manner, control the transmitter to send the resource request information to the node, and
   after the transmitter sends the resource request information to the node, the receiver is further configured to receive the target transmission resource from the node, the target transmission resource being sent from the node in response to the node receiving the resource request information from the transmitter.

4. The apparatus according to claim 3, wherein
   the macro network system information that is sent by the base station and received by the receiver further comprises a micro network working frequency, a scheduled scheduling assignment (SA) resource pool having at least one scheduled SA resource and a contention SA resource pool having at least one contention SA resource, wherein each scheduled SA resource among the at least one scheduled SA resource in the scheduled SA resource pool and each contention SA resource among the at least one contention SA resource in the contention SA resource pool are time-frequency resources in a frequency band in which the micro network working frequency is located, and each time-frequency resource is used to indicate a respective time-frequency location of a transmission resource among the plurality of transmission resources in the vehicular network and a respective modulation and coding scheme, or the macro network system information that is sent by the base station and received by the receiver further comprises the micro network working frequency, a scheduled transmission resource pool having at least one scheduled transmission resource, and a contention transmission resource pool having at least one contention transmission resource, wherein each scheduled transmission resource among the at least one scheduled transmission resource in the scheduled transmission resource pool and each contention transmission resource among the at least one contention transmission resource in the contention transmission resource pool are transmission resources among the plurality of transmission resources in the vehicular network and in the frequency band in which the micro network working frequency is located.

5. The apparatus according to claim 4, wherein the macro network system information that is sent by the base station and received by the receiver comprises the micro network working frequency, the scheduled SA resource pool having the at least one scheduled SA resource, and the contention SA resource pool having the at least one contention SA resource, the macro network system information sent by the base station and received by the receiver further comprises a node SA resource pool having at least one node SA resource, and each node SA resource among the at least one node SA resource in the node SA resource pool is a time-frequency resource in the frequency band in which the micro network working frequency is located, and each time-frequency resource is used to indicate a respective time-frequency location of a transmission resource among the plurality of transmission resources in the vehicular network and a respective modulation and coding scheme.

6. The apparatus according to claim 4, wherein the macro network system information sent by the base station and received by the receiver comprises the micro network working frequency, the scheduled transmission resource pool having the at least one scheduled transmission resource, and the contention transmission resource pool having the at least one contention transmission resource, the macro network system information sent by the base station and received by the receiver further comprises a node transmission resource pool having at least one node transmission resource, and each node transmission resource among the at least one node transmission resource in the node transmission resource pool is a transmission resource among the plurality of transmission resources in the vehicular network and in the frequency band in which the micro network working frequency is located.

7. The apparatus according to claim 6, wherein the processor is further configured to:

determine whether the node transmission resource information carried in the macro network system information and received by the receiver includes the node transmission resource pool; and when the processor determines that the node transmission resource information carried in the macro network system information includes the node transmission resource pool, the processor is configured to:

search the node transmission resource pool for at least one node transmission resource among the at least one node transmission resource that is in the frequency band in which the micro network working frequency is located and on which the micro network system information sent by the node can be received; and select, based on the search of the node transmission resource pool, a node transmission resource from among the at least one node transmission resource in the node transmission resource pool as the target node transmission resource.

8. The apparatus according to claim 5, wherein the micro network system information that is sent by the node and received by the receiver comprises a micro network scheduled SA sending resource pool having at least one micro network scheduled SA sending resource and a micro network contention SA sending resource pool having at least one micro network contention SA sending resource, each micro network scheduled SA sending resource among the at least one micro network scheduled SA sending resource in the micro network scheduled SA sending resource pool and each micro network contention SA sending resource among the at least one micro network contention SA sending resource in the micro network contention SA sending resource pool are time-frequency resources in the frequency band in which the micro network working frequency is located, and each respective time-frequency resource is used to indicate a respective time-frequency location of a transmission resource among the plurality of transmission resources in the vehicular network and a respective modulation and coding scheme.

9. The apparatus according to claim 6, wherein the micro network system information that is sent by the node and received by the receiver further comprises a micro network scheduled sending resource pool having at least one micro network scheduled sending resource and a micro network contention sending resource pool having at least one micro network contention sending resource, each micro network scheduled sending resource among the at least one micro network scheduled sending resource in the micro network scheduled sending resource pool and each micro network contention sending resource among the at least one micro network contention sending resource in the micro network contention sending resource pool are transmission resources among the plurality of transmission resources in the vehicular network and in the frequency band in which the micro network working frequency is located.

10. The apparatus according claim 4, wherein the processor is configured to:

complete a configuration of the processor according to the micro network identifier and the node identifier, and establish a connection to the node.

11. A method for an apparatus in a vehicular network, the method comprising:

receiving, by the apparatus, macro network system information sent by a base station remotely located from the apparatus, wherein the macro network system information carries node transmission resource information;

determining, by the apparatus, a target node transmission resource according to the node transmission resource information;

receiving, by the apparatus, according to the target node transmission resource, micro network system information sent by a node, wherein the micro network system information carries a micro network identifier and a node identifier of the node;

accessing, by the apparatus, a micro network according to the micro network identifier and the node identifier that are carried in the micro network system information;

when a communication task is generated, determining, by the apparatus, a target resource scheduling manner in the accessed micro network according to a task type of the communication task;

obtaining, by the apparatus and independently of the base station, a target transmission resource in the accessed micro network according to the determined target resource scheduling manner; and sending, by the apparatus, based on the target transmission resource, data that corresponds to the communication task, wherein the target node transmission resource and the target transmission resource are among a plurality of transmission resources in the vehicular network.

12. The method according to claim 11, wherein the obtaining the target transmission resource in the accessed micro network according to the determined target resource scheduling manner comprises:

when the determined target resource scheduling manner is a contention manner, determining the target transmission resource in the accessed micro network according to the micro network system information, or when the determined target resource scheduling manner is a centralized scheduling manner, sending resource request information to the node, and receiving the target transmission resource from the node, the target transmission resource being sent from the node in response to the node receiving the resource request information.

13. The method according to claim 12, wherein the macro network system information further comprises:

a micro network working frequency, a scheduled scheduling assignment (SA) resource pool having at least one scheduled SA resource, and a contention SA resource pool having at least one contention SA resource, wherein each scheduled SA resource among the at least one scheduled SA resource in the scheduled SA resource pool and each contention SA resource among the at least one contention SA resource in the contention SA resource pool are time-frequency resources in a frequency band in which the micro network working frequency is located, and each time-frequency resource is used to indicate a respective time-frequency location of a transmission resource among the plurality of transmission resources in the vehicular network and a respective modulation and coding scheme, or the macro network system information further comprises: the micro network working frequency, a scheduled transmission resource pool having at least one scheduled transmission resource, and a contention transmission resource pool having at least one contention transmission resource, wherein each scheduled transmission resource among the at least one scheduled transmission resource in the scheduled transmission resource pool and each contention transmission resource among the at least one contention transmission resource in the contention transmission resource pool are transmission resources among the plurality of transmission resources in the vehicular network and in the frequency band in which the micro network working frequency is located.

14. The method according to claim 13, wherein when the macro network system information comprises the micro network working frequency, the scheduled SA resource pool having the at least one scheduled SA resource, and the contention SA resource pool having the at least one contention SA resource, the node transmission resource information carried in the macro network system information is-includes a node SA resource pool having at least one node SA resource, each node SA resource among the at least one node SA resource in the node SA resource pool is a time-frequency resource in the frequency band in which the micro network working frequency is located, and each time-frequency resource is used to indicate a respective time-frequency location of a transmission resource among the plurality of transmission resources in the vehicular network and a respective modulation and coding scheme.

15. The method according to claim 13, wherein when the macro network system information further comprises the micro network working frequency, the scheduled transmission resource pool having the at least one scheduled transmission resource, and the contention transmission resource pool having the at least one contention transmission resource, the node transmission resource information carried in the macro network system information includes a node transmission resource pool having at least one node transmission resource, and each node transmission resource among the at least one node transmission resource in the node transmission resource pool is a transmission resource among the plurality of transmission resources in the vehicular network and in the frequency band in which the micro network working frequency is located.

16. The method according to claim 15, wherein when the node transmission resource information carried in the macro network system information is-includes the node transmission resource pool, the determining the target node transmission resource according to the node transmission resource information comprises:

searching the node transmission resource pool for at least one node transmission resource among the at least one node transmission resource that is in the frequency band in which the micro network working frequency is located and on which the micro network system information sent by the node can be received, and selecting, based on the searching of the node transmission resource pool, a node transmission resource from among the at least one node transmission resource in the node transmission resource pool as the target node transmission resource.

17. The method according to claim 14, wherein the micro network system information further comprises: a micro network scheduled SA sending resource pool having at least one micro network scheduled SA sending resource and a micro network contention SA sending resource pool having at least one micro network contention SA sending resource, each micro network scheduled SA sending resource among the at least one micro network scheduled SA sending resource in the micro network scheduled SA sending resource pool and each micro network contention SA sending resource among the at least one micro network contention SA sending resource in the micro network contention SA sending resource pool are time-frequency resources in the frequency band in which the micro network working frequency is located, and each respective time-frequency resource is used to indicate a respective time-frequency location of a transmission resource among the plurality of transmission resources in the vehicular network and a respective modulation and coding scheme.

18. The method according to claim 15, wherein the micro network system information further comprises: a micro network scheduled sending resource pool having at least one micro network scheduled sending resource and a micro network contention sending resource pool having at least one micro network contention sending resource, each micro network scheduled sending resource among the at least one micro network scheduled sending resource in the micro network scheduled sending resource pool and each micro network contention sending resource among the at least one micro network contention sending resource in the micro network contention sending resource pool are transmission resources among the plurality of transmission resources in the vehicular network and in the frequency band in which the micro network working frequency is located.

19. The method according to claim 17, wherein the micro network system information further comprises: a mapping relationship between the task type of the communication task and at least one resource scheduling manner.

20. The method according to claim 13, wherein the accessing the micro network according to the micro network identifier and the node identifier that are carried in the micro network system information comprises:

completing, by the apparatus, a configuration of the apparatus according to the micro network identifier and the node identifier, and establishing a connection to the node.

* * * * *

UNITED STATES PATENT AND TRADEMARK OFFICE
CERTIFICATE OF CORRECTION

PATENT NO. : 10,477,536 B2  
APPLICATION NO. : 15/637315  
DATED : November 12, 2019  
INVENTOR(S) : Li et al.

Page 1 of 1

It is certified that error appears in the above-identified patent and that said Letters Patent is hereby corrected as shown below:

On the Title Page

Item (57) Abstract, Line 2: "tear scheduling" should read -- for scheduling --.

In the Claims

Claim 4, Column 32, Line 58: "that is" should be deleted.

Claim 4, Column 33, Line 9: "that is" should be deleted.

Claim 5, Column 33, Line 27: "that is" should be deleted.

Claim 8, Column 34, Line 20: "that is" should be deleted.

Claim 9, Column 34, Line 42: "that is" should be deleted.

Claim 14, Column 36, Line 15: "is-includes" should read -- includes --.

Claim 16, Column 36, Line 45: "is-includes" should read -- includes --.

Signed and Sealed this  
Twenty-first Day of July, 2020

Andrei Iancu  
*Director of the United States Patent and Trademark Office*